United States Patent [19]

Rimback

[11] Patent Number: 5,685,109
[45] Date of Patent: Nov. 11, 1997

[54] TRAP FOR FLYING INSECTS

[75] Inventor: Peter Rimback, Oakwood, Ohio

[73] Assignee: Hanover Catalog Holdings, Inc., Weehawken, N.J.

[21] Appl. No.: 498,683

[22] Filed: Jun. 30, 1995

[51] Int. Cl.⁶ ............................................. A01M 1/10
[52] U.S. Cl. .................................... 43/122; 43/107
[58] Field of Search ............... 43/122, 107; D22/122

[56] References Cited

U.S. PATENT DOCUMENTS

| D. 306,061 | 2/1990 | Cutter | D22/122 |
|---|---|---|---|
| D. 308,564 | 6/1990 | Wefler | D22/122 |
| 1,533,294 | 4/1925 | Zinner | 43/122 |
| 2,029,989 | 2/1936 | Driggers | 43/122 |
| 2,046,430 | 7/1936 | Rutherford | 43/107 |
| 3,855,727 | 12/1974 | Canoy | 43/122 |
| 3,997,999 | 12/1976 | Evans | 43/107 |
| 4,360,987 | 11/1982 | Lowder | 43/122 |
| 4,794,724 | 1/1989 | Peters | 43/122 |
| 4,858,374 | 8/1989 | Clemons | 43/122 |
| 5,175,958 | 1/1993 | Wedemeyer | 43/121 |

OTHER PUBLICATIONS

Seabright, Yellow Jacket Inn and Wasp Trap, brochure
SureFire, Yellow Jacket Trap, *Solutions*, p. 21.
Wasp/Yellow Jacket Trap, p. 22.

G.O. Poinar, Jr., et al. "Do Some Yellow Jacket Traps Preform Better Than Others?", *Pest Management*, Jul. 1993, p. 21.

PIC Corporation, The Newest and Most Effective Yellow Jacket & Wasp Trap, packaging.

WaspEATER, Wasp Trap, *Improvements*, p. 17 and instructions Oak Stump Farm, Yellow Jacket Wasp Trap, brochure.

*Primary Examiner*—Kurt Rowan
*Attorney, Agent, or Firm*—Thompson Hine & Flory LLP

[57] ABSTRACT

The invention is a trap for flying insects. The trap is designed for attracting, trapping and killing flying pests such as wasps, yellow jackets and hornets. The trap is shaped to utilize both a liquid carbohydrate bait and a solid protein bait. The trap is preferably vacuumed formed from a single piece of UV-resistant plastic material. The trap for flying insects comprises a pair of opposing side panels, a plurality of insect entrances formed in the side panels, an integrally molded central tray attached to the side panels by living hinges, an integrally molded trough formed within the central tray, and an integrated, elevated bait support extending upwardly from the trough, wherein the side panels pivot to engage each other and the bottom tray to form an enclosed volume for trapping and holding flying insects.

14 Claims, 3 Drawing Sheets

TRAP FOR FLYING INSECTS

BACKGROUND

The present invention relates to a pest trap, and more particularly, to an outside trap designed to attract, trap and kill flying insects such as yellow jackets, wasps and hornets.

Certain flying insects, such as yellow jackets, wasps and hornets, do not feed exclusively on plant nectar, but instead feed on sweet liquid carbohydrates. Since the developing larvae of such insects require proteinaceous materials, the worker insects scavenge for food, such as meat, around picnics, barbecues, trash or other exposed food sources to take back to their nests to feed the growing larvae. It is annoying and sometimes harmful to have these flying insects swarming around human food where they often sting humans.

Ways of disposing of these flying insects include jar or bottle-type bait traps having insect entryways of small holes and in which the user places some bait, usually either bits of protein (e.g., meat), or in the alternative, a liquid carbohydrate to lure the flying insects into the trap or both. The flying insects enter the trap, eat the protein and/or drink the liquid and then attempt to fly upwardly to return to the nest. As the trap is enclosed but for the small entryway openings, the flying insects are trapped and eventually die.

However, many traps are large, difficult to clean and reuse, and are expensive to fabricate. Accordingly, there is a need for a flying insect trap that effectively lures, traps and holds the insects. Further, there is a need for a trap which is safe, easy to use, non-toxic and reusable.

SUMMARY OF THE INVENTION

The present invention is a one-piece trap for flying insects which is inexpensive to fabricate and easy to maintain. In a preferred embodiment of the invention, the trap is capable of holding both protein and carbohydrate types of bait. The invention includes a pair of opposing side panels; a plurality of insect entrances found in the side panels; an integrally molded central tray attached to the side panels by living hinges; and an integrally molded trough formed within the central tray, wherein the side panels pivot to engage each other and the bottom tray to form an enclosed volume for trapping and holding flying insects.

In the preferred embodiment, the trap further includes an integrally molded, elevated bait support extending upwardly from the trough, and the insect entrances are in the shape of frustro-conical entrance holes on each of the side panels. The side panels include a plurality of vent perforations surrounding the insect entrance to allow bait aroma to escape from the interior of the trap. The side panels include a releasable and interlocking snap closure. Further, each of the side panels is connected to the central tray by a living hinge and the trap is formed of a single sheet of vacuum-formed flexible, transparent plastic.

According to a further aspect of the present invention, the trap is formed by the process comprising the steps of obtaining a sheet of I/V-resistant plastic, placing the sheet in a mold having a shape defining the trap, vacuum forming the plastic to form a molded piece of plastic in the shape of the trap, and removing the molded plastic from the mold, wherein the molded plastic can be folded to form an enclosed trap.

Accordingly, it is an object of the present invention to provide a trap for flying insects which is highly attractive to insects; a trap which accommodates both a protein and a carbohydrate bait; a trap which is non toxic and reusable; a trap which quickly and effectively lures and kills the flying insects; a trap from which the flying insects cannot escape; a trap which is formed in a relatively inexpensive manner from a single piece of plastic material; and a system which is easy to use and maintain.

Other objects and advantages of the present invention will be apparent from the following description, the accompanying drawings and the appended claims.

DETAILED DESCRIPTION

FIGS. 1–4 show a trap for flying insects, generally designated 10, which has a substantially triangular-shaped cross-section. The trap 10 is formed of a single piece of liquid-impermeable plastic material, preferably PETG, a plastic which provides UV protection so the trap 10 will not degrade when exposed to sunlight. Further, the trap is transparent so that the user can observe the contents of the trap 10 without opening it. Additionally, the plastic may be colored with a pigment, such as green, which makes it pleasing to the eye.

Figure 1:
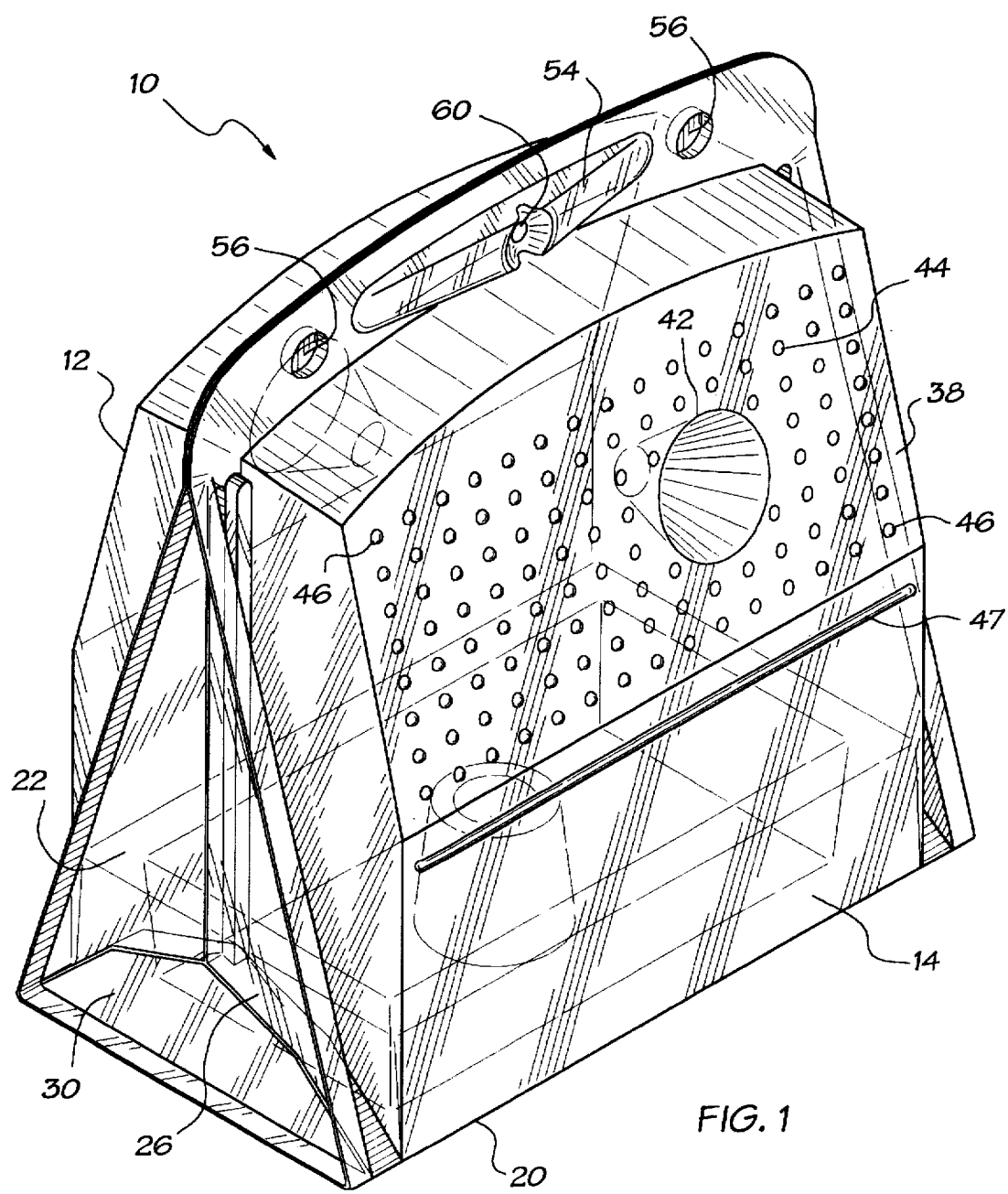
FIG. 1 is a front perspective view of a preferred embodiment of a trap for flying insects of the present invention in a closed configuration.
Figure 2:
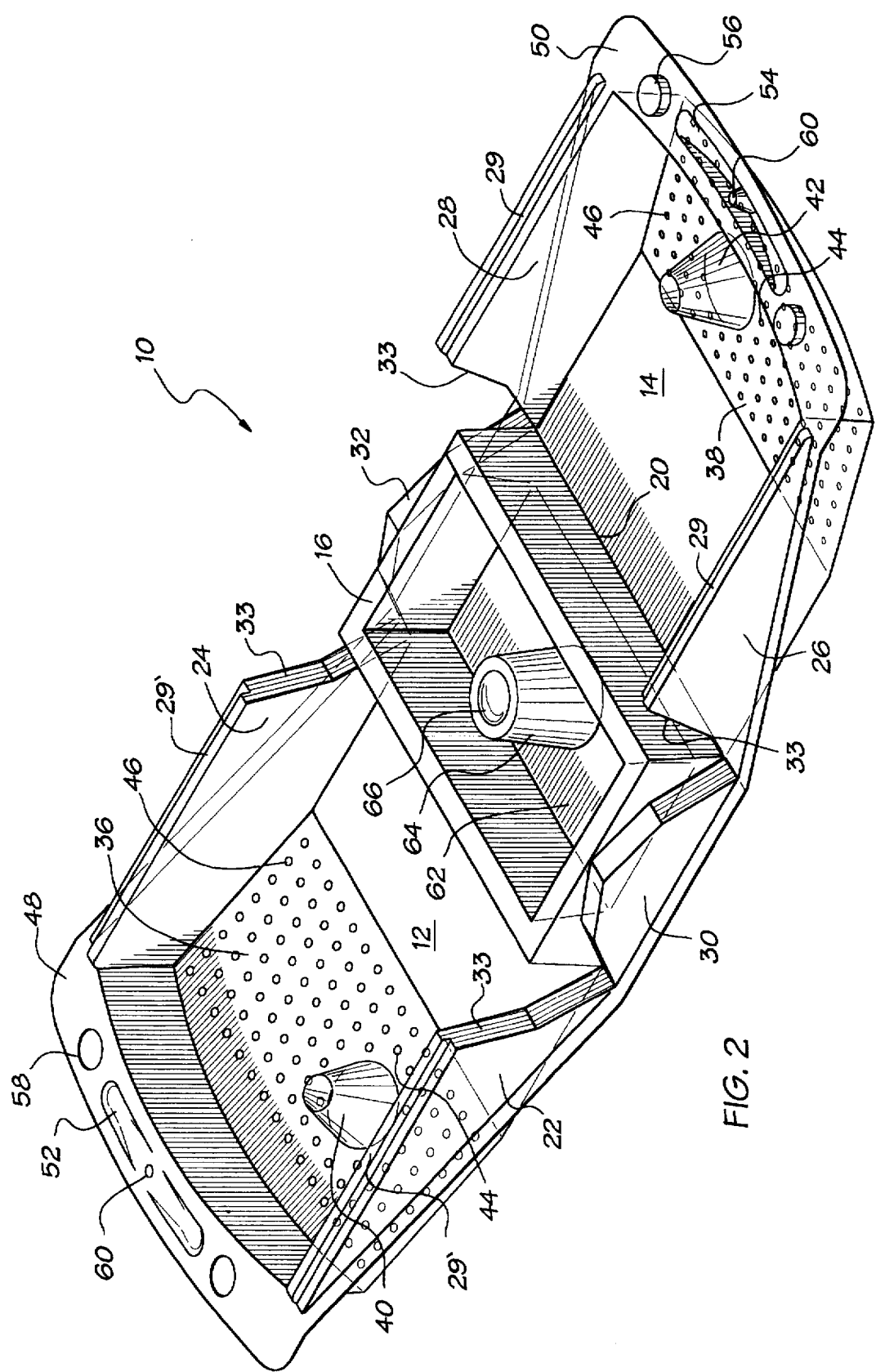
FIG. 2 is a front perspective view of the trap of FIG. 1 in an open configuration.

As shown in FIGS. 1–2, the trap 10 includes a pair of opposing side panels 12,14 and an integrally molded central tray 16. The central tray 16 is attached along its opposing longitudinal bottom edges to each side panel 12,14 by living hinges 18,20 (see also FIG. 3). A "living hinge" is defined herein as an integral plastic hinge.

Each side panel 12,14 includes two opposing, substantially triangular-shaped end portions 22,24 and 26,28, respectively, which extend at substantially a 90° angle therefrom. These triangular-shaped end portions 22–28 include rabbeted end edges 29,29', which are shaped such that, when the trap 10 is in a closed configuration, as in FIG. 1, the edges opposing end portions mesh with one another. The central tray 16 also includes five-sided end bosses 30,32 projecting from the transverse ends of the tray. The bottom edges 33 of the triangular end portions 22–28 are shaped to meet the edges of the end bosses 30,32 to form a completely closed structure when the side panels 12,14 are closed.

Each of the side panels 12,14 includes two wall segments oriented at a slight angle with respect to one another. The top segments 36,38 of each of the walls 14, 16 include frustro-conical entrance holes 40,42. The walls of the holes 40,42 taper inwardly so that an attracted insect has an easier time finding its way into the trap than possibly finding its way out of the trap. Surrounding the frustro-conical entrance holes 40,42, the top segmented walls 36,38 include a plurality of smaller vent holes 44. Preferably there are forty vent holes encircling the entrance holes which allow the aroma of the bait to leave the trap 10. These vent holes 44, as well as the entrance holes 40,42, must be of a size that will prevent escape of trapped insects. The remainder of the top segmented walls 36,38 includes a plurality of small, spaced appearance bumps 46.

Also, seen in FIG. 1, the side panels 14,16 include a ridge 47 on the lower segmented portion. The remainder of the lower segmented portions of the side panel 4,16 are smooth. This smooth area is sized to receive a descriptive label (not shown).

Figure 3:
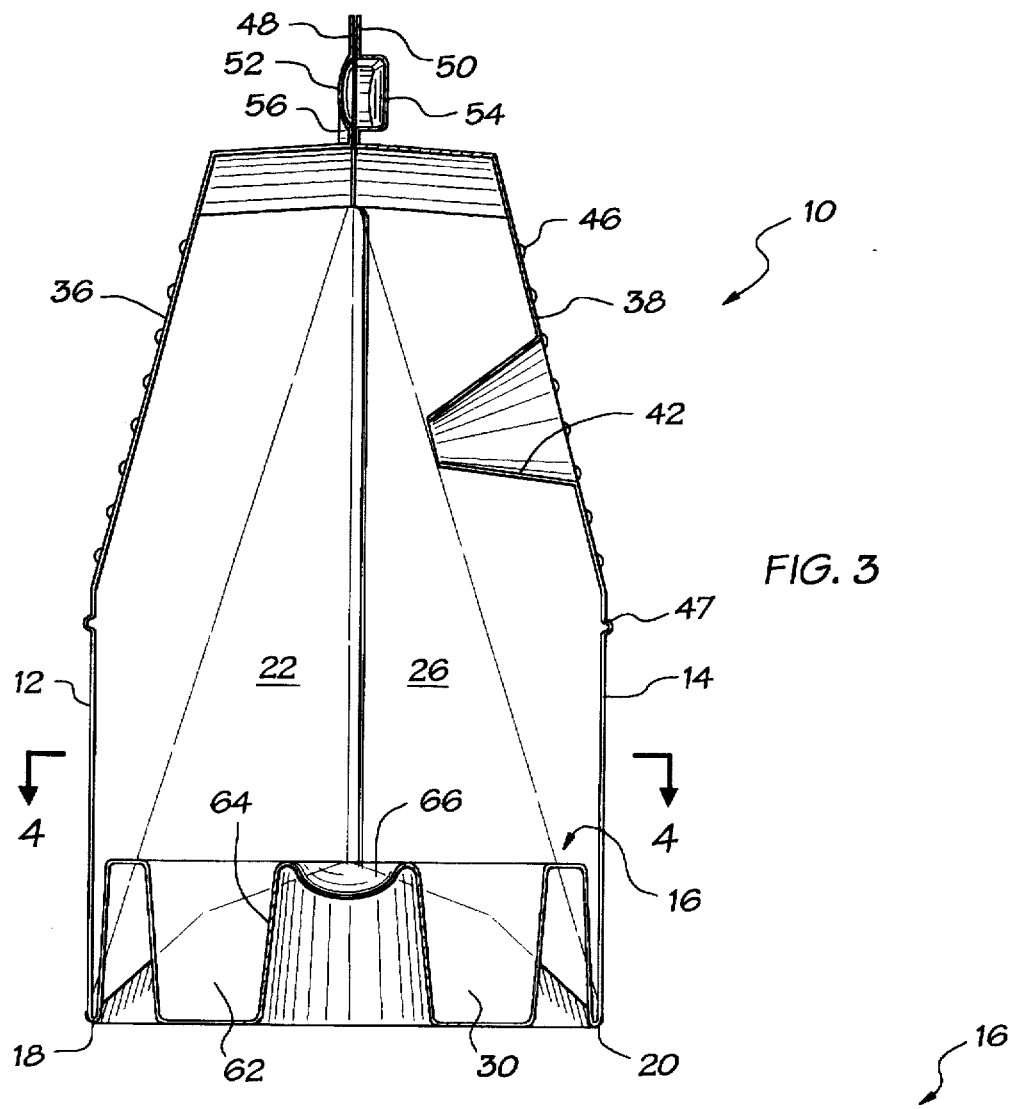
FIG. 3 is a side elevational view in section of the trap of FIG. 1.

As seen in FIG. 2, the side panels 12,14 further include top flaps 48,50 shaped to provide a releasable, interlocking snap closure. The top flaps include a center elongate protruding member 52 and a recessed portion 54 in the opposing side panel, as shown in FIGS. 1 and 3. The two side panels are held together with two button protrusions 56,56 which frictionally engage complementarily-shaped corresponding circular recessed portions 58,58 on the opposing side panel providing the snap closure. The top flaps 48,50 of the trap 10 also include a hanging hole 60 which is centrally located horizontally along the flaps 48,50 so that during use, the trap 10 suspended from a hook by a string (not shown). The trap may also be set on a flat surface.

Figure 4:
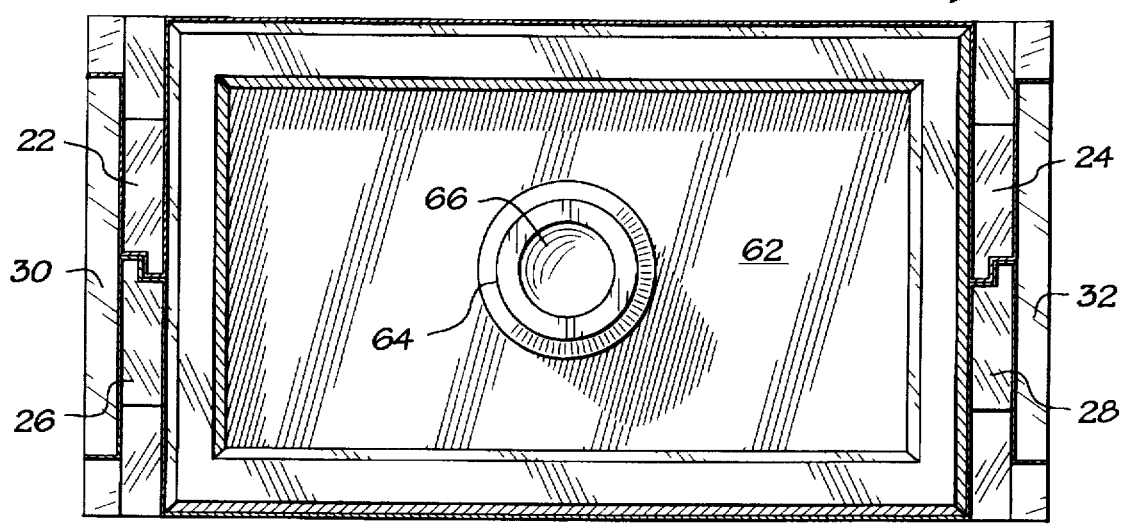
FIG. 4 is a cross-sectional view taken along line 4—4 in FIG. 3.

The central tray 16 as shown in FIG. 4, includes an integrally molded trough 62 between the five-sided end portions. The trough is substantially rectangular and is large enough to permit about one cup of carbohydrate liquid bait therein. The central tray 16 further includes an integrally molded, elevated bait support 64 which extends upwardly from the trough 62 above the level of the liquid in the tray. The bait support 64 is generally, cylindrical having a top cup portion 66 for the placement of the solid bait.

The trap 10 is preferably unitary in structure and is vacuumed formed from a single piece of plastic in a mold, thereby providing ease in manufacturing and providing a less expensive product. A single piece of unformed sheet plastic is placed on a mold. The mold has a shape which defines the insect trap as described hereinabove (see especially FIG. 2). The unformed sheet plastic is then vacuumed-formed to acquire the shape of the mold and removed.

The trap 10 is used as follows. The trap 10 is baited with a carbohydrate, typically a sweet fruit juice and/or a protein such as meat, raw fish, cat food, or hamburger so that the trap is more attractive to the insects. The juice is poured into the trough 62 in the central tray 16. The protein is placed in the cup 66 in the elevated bait support 64, out of the liquid. Preferably, a few drops of water are placed on the meat to keep it moist and odoriferous. Shortly before outdoor activities, the trap is placed downwind at the perimeter of the area to be protected. If elevated, the trap should be placed 3 to 5 feet off the ground. Insects smell the sweetened juice and enter the trap. The juice, in addition to being an attractant, provides a quicker death for the insects. Since after several attempts at escaping, the insects will fall into the liquid and drown. This is advantageous since new insects tend to hesitate more before entering the trap if there are other insects flying in the trap. Further, the dead insect carcasses provide additional protein to bait new insects into the trap.

The bait should be replaced every day for greatest effectiveness. To empty the trap, the trap should first be inspected to be sure that no insects are alive. If necessary, the trap can be submerged in water for a period of about 5 minutes. The trap can then be opened, rinsed with water and re-baited for reuse.

Having described the invention in detail and by reference to preferred embodiments thereof, it will be apparent that modifications and variations are possible without departing from the scope of the invention defined in the appended claims.

What is claimed is:

1. A trap for flying insects comprising:

pair of opposing side panels;

plurality of insect entrances formed in the side panels;

an integrally molded central tray attached to the side panels by hinges; and an integrally molded trough formed within the central tray, wherein the side panels pivot to engage each other and the central tray form an enclosed volume for trapping and holding flying insects.

2. The trap of claim 1 further including an integrally molded, elevated bait support extending upwardly from the trough.

3. The trap of claim 2 wherein all parts of the trap are formed simultaneously by a single sheet of vacuum formed plastic.

4. The trap of claim 1 wherein when assembled, the trap has a substantially triangular cross-section.

5. The trap of claim 1 wherein the plurality of insect entrances are in the shape of frustro-conical entrance holes on each of the side panels.

6. The trap of claim 5 wherein the side panels include a plurality of vent perforations surrounding the insect entrances.

7. The trap of claim 1 further comprising a releasable, interlocking snap closure.

8. The trap of claim 1 wherein each of the side panels are connected to the central tray by a living hinge.

9. The trap of claim 1 wherein the trap is formed of flexible, transparent plastic.

10. A trap for flying insects formed of a single piece of material comprising:

pair of opposing side panels;

a frustro-conical shaped insect entrance holes formed in the side panels;

an integrally molded central tray attached to the side panels by integral plastic hinges;

an integrally molded trough formed within the bottom tray, and an integrally molded, elevated bait support extending upwardly from the trough;

wherein all parts of the trap are formed simultaneously by a single sheet of vacuum formed plastic and wherein the side panels pivot to engage each other and the central tray to form an enclosed trap for trapping and holding flying insects.

11. The trap of claim 10 wherein when assembled, the trap has a substantially triangular cross-section.

12. The trap of claim 10 wherein the side panels include a plurality of vent perforations surrounding the entrance holes.

13. The trap of claim 12 further comprising a releasable, interlocking snap closure.

14. The trap of claim 13 wherein the trap is formed of flexible, transparent plastic.

* * * * *